United States Patent [19]

Turk et al.

[11] 4,169,698
[45] Oct. 2, 1979

[54] POST CURE INFLATOR

[75] Inventors: Leonard G. Turk, Aurora; Gerald J. Yuhas, Canfield, both of Ohio; Armindo Cantarutti, Milan, Italy

[73] Assignee: NRM Corporation, Akron, Ohio

[21] Appl. No.: 872,489

[22] Filed: Jan. 26, 1978

[51] Int. Cl.² .............................................. B29H 5/02
[52] U.S. Cl. .................................. 425/28 P; 425/38; 425/36; 425/24; 425/44
[58] Field of Search ................. 425/17, 19, 20, 21, 425/22, 23, 24, 25, 28 P, 32, 33, 35, 38, 39, 44, 36, 30, 42, 436, 446

[56] References Cited

U.S. PATENT DOCUMENTS

| | | | |
|---|---|---|---|
| 2,593,137 | 4/1952 | Glynn | 425/36 X |
| 2,734,225 | 2/1956 | Glynn | 425/36 X |
| 2,963,737 | 12/1960 | Soderquist | 425/42 X |
| 2,978,741 | 4/1961 | Soderquist | 425/36 X |
| 2,987,770 | 6/1961 | Powell | 425/23 |
| 3,008,180 | 11/1961 | Woodhall | 425/38 |
| 3,015,845 | 1/1962 | Duerksen | 425/23 |
| 3,039,839 | 6/1962 | Waters et al. | 425/44 X |
| 3,065,499 | 11/1962 | Brundage | 425/32 |
| 3,074,109 | 1/1963 | Duerksen | 425/23 |
| 3,075,237 | 1/1963 | Soderquist | 425/44 |
| 3,130,446 | 4/1964 | Duerksen | 425/36 |
| 3,131,243 | 4/1964 | Fannen | 425/436 X |
| 3,137,032 | 6/1964 | MacMillan | 425/23 X |
| 3,170,187 | 2/1965 | Brundage | 425/44 X |
| 3,184,794 | 5/1965 | Sherkin | 425/19 |
| 3,214,790 | 11/1965 | Wright et al. | 425/44 X |
| 3,222,715 | 12/1965 | Harris | 425/32 |
| 3,233,284 | 2/1966 | MacMillan | 425/23 X |
| 3,483,596 | 12/1969 | Ulm | 425/44 X |
| 3,495,647 | 2/1970 | Branick | 425/446 X |
| 4,076,473 | 2/1978 | MacMillan | 425/24 X |
| 4,092,090 | 5/1978 | Yuhas et al. | 425/28 P |

Primary Examiner—J. Howard Flint, Jr.
Attorney, Agent, or Firm—Maky, Renner, Otto & Boisselle

[57] ABSTRACT

A trunnion type post cure inflator includes a pre-positioning platform and a loader to pick up a tire and bring it to a precise center and in parallelism with an open inside multi-stepped PCI ring, one of a pair capable of sealing different bead diameter tires. The loader works partly in conjunction with the PCI opening and closing mechanism so that the PCI is cleared for loading and the loader cleared for locking, each simultaneously. Tire holding devices are provided to permit cooling without inflation and dump unloading when the trunnion is rotated. Precision centering is obtained minimizing "no PCI" defects and enabling use of multi-step rings so that such rings do not require changing for different tire bead diameters.

24 Claims, 11 Drawing Figures

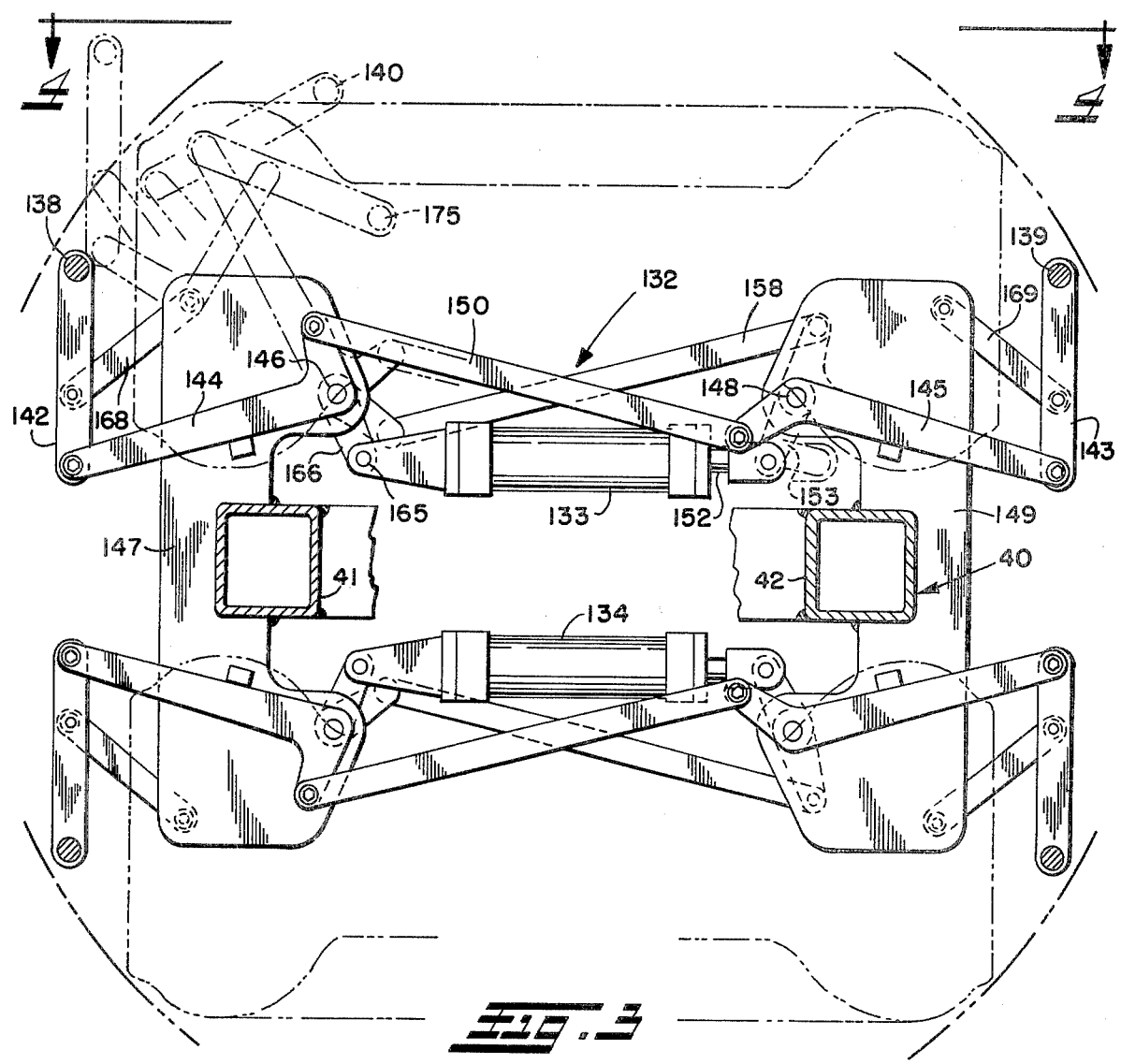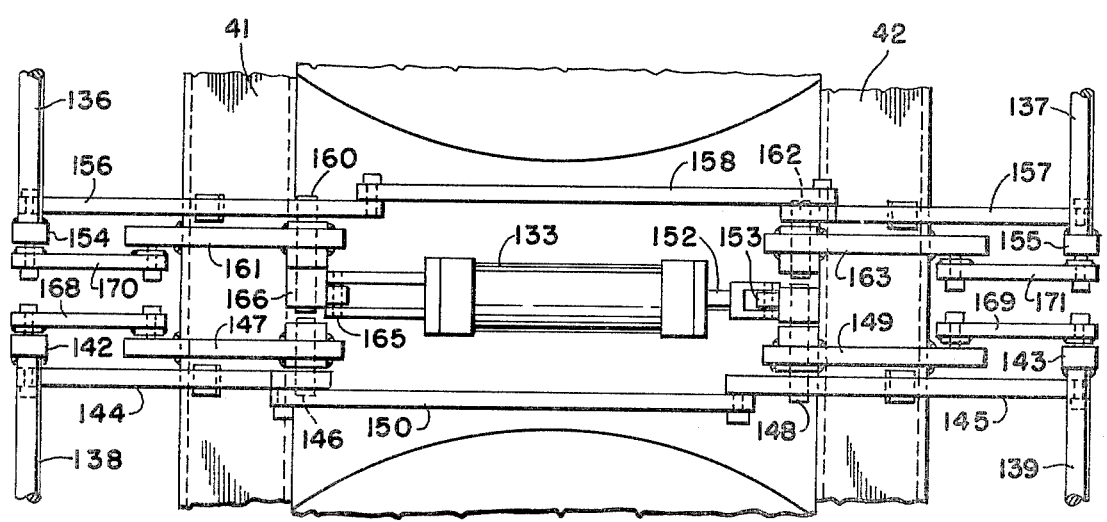

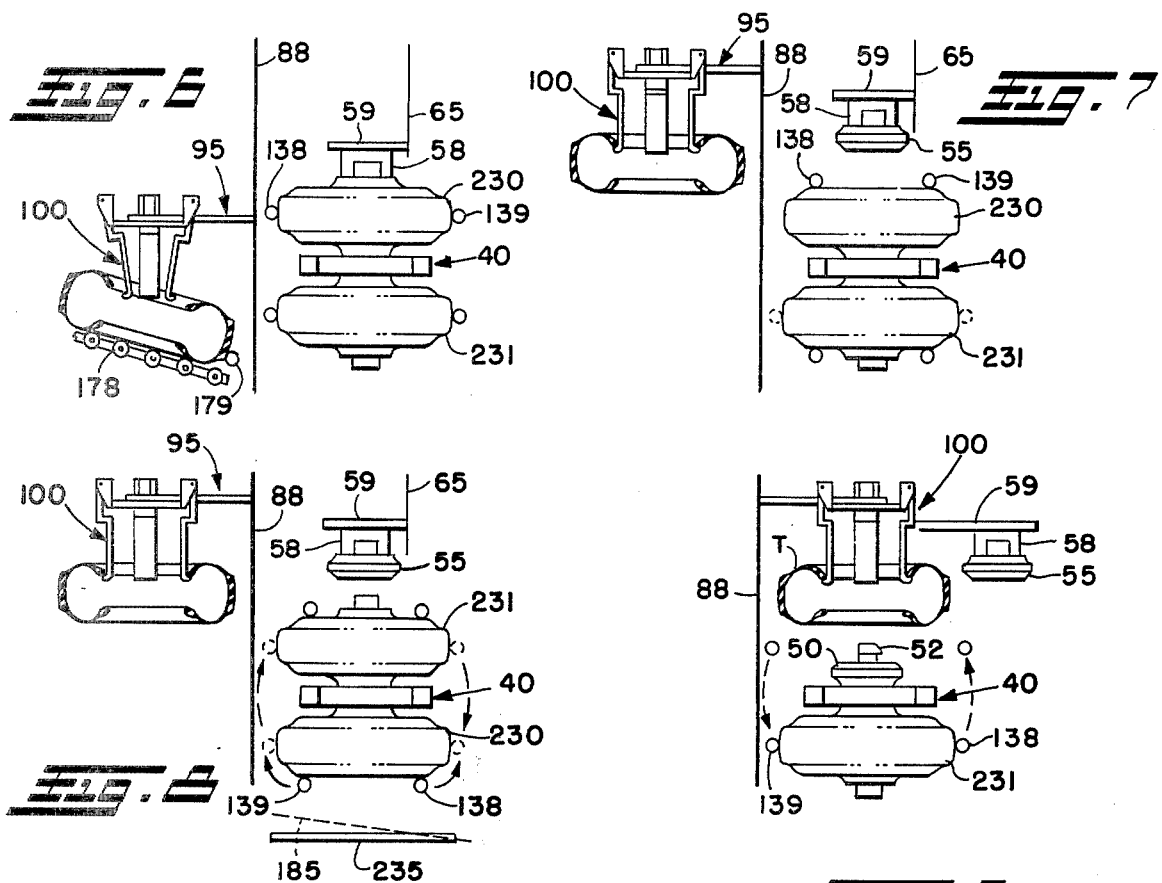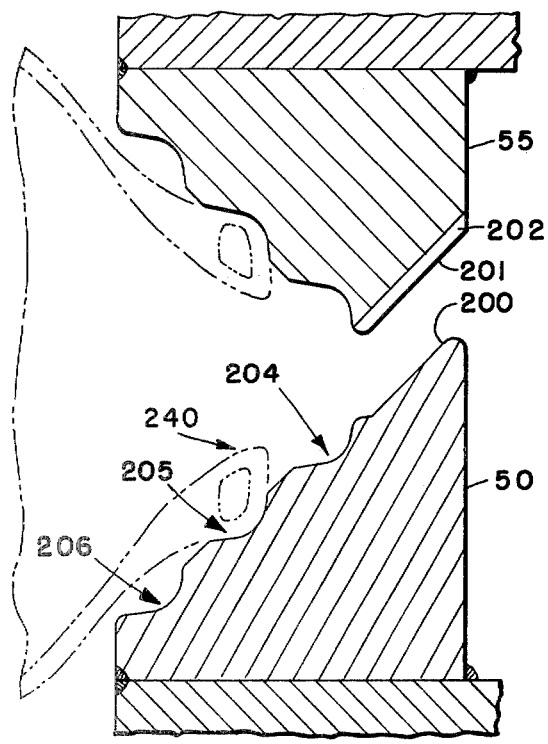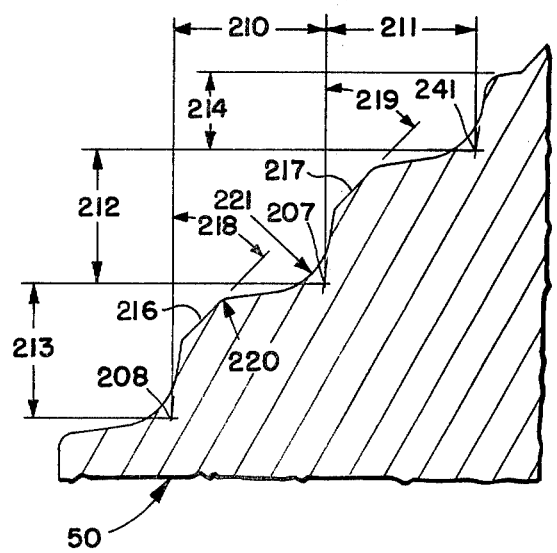

POST CURE INFLATOR

DISCLOSURE

This invention relates generally as indicated to a post cure inflator and more particularly to a post cure inflator which will substantially eliminate "no PCI" defects, and which can be used without modification to post cure tires of differing bead diameters.

BACKGROUND OF THE INVENTION

In tire curing, where post inflation is employed, one of the most common defects is known as a "no PCI" defect. This means that for some reason the tire was not properly subjected to the required post cure inflation. When post cure inflation is employed, it is usually accomplished by a separate machine positioned at the rear of the tire shaping and curing press. In order to be positioned properly in the post cure inflator, the tire must be restrained or recaught after discharge from the press and properly centered for engagement with the bead engaging rims when the post cure inflator closes. Many post cure inflators use inclined conveyors which are a continuation of the discharge conveyor of the press. Tires can achieve a substantial momentum which is oftentimes accentuated by the unloading mechanism of the press. Usually, restraint and centering devices engage the outside or tread of the tire and are complex and costly, requiring adjustment for different sizes and shapes of tires.

A common complaint about post cure inflators is that tire restraint or centering devices fail to perform properly and tires have been known to pass completely through a post cure inflator. Obviously, if the tire is not properly centered, a defective tire may result.

Attempts have been made to provide greater reliability for post cure inflators. For example, power driven horizontally disposed conveyor belts have been employed to reduce the momentum of the tire as it moves into the post cure inflator. While somewhat effective, such belt drives still require outside centering and add to the cost of equipment. Moreover, with outside centering, the post inflation rings generally require complex relatively large interfitting pilot surfaces such as shown in Brundage U.S. Pat. No. 3,170,187 dated Feb. 23, 1965. While such patent illustrates an attempt to achieve a ring which will seat and inflate tires of differing bead diameters, obviously, without proper centering for all of the various steps of the ring, such ring cannot achieve the purpose intended. The pilot surface will be effective to center the tire only with regard to the smallest bead seat. Accordingly, applicants are not aware of any automatic post cure inflator wherein a single bead ring has been employed successfully to inflate tires of differing bead diameters.

One attempt to solve some of the above outlined problems is disclosed in the copending application of Gerald J. Yuhas et al, Ser. No. 797,938 filed May 18, 1977 now U.S. Pat. No. 4,092,090, dated May 30, 1978 entitled "Tire Curing System", and assigned to the assignee of the present application. In such copending application there is illustrated a press-post inflator combination wherein the press places the tire directly onto or in the post cure inflator. While the tire curing system of the aforementioned patent does confront some of the problems met by the invention of this application, it represents a relatively costly solution requiring a substantial capital investment. It cannot solve the problem in press lines already in existence.

SUMMARY OF THE INVENTION

The post cure inflator of the present invention may be utilized with substantially any type of tire curing press and incorporates as an integral part thereof a loader mechanism which is adapted to pick up a tire from a prepositioning platform and center the same with respect to a vertical axis. The loader shifts the tire thus centered to bring it into alignment with the post cure inflator simultaneously with the shifting of the unlocked ring of the post cure inflator clear of the loading operation. The loader then places the tire on the exposed ring of the post cure inflator with the centering of the tire being sufficiently precise so that the tire will be positioned on the proper step of the multi-step ring. After the tire is released the loader swings out of the way with the simultaneous repositioning of the outer ring for subsequent lock-up and inflation of the tire. Tire holding bars are provided on the post cure inflator, which is of the trunnion type, so that the tires may be cycled therethrough without inflation if desired, and can be held to the trunnion for roll over dump discharge precisely beneath the post cure inflator.

It is accordingly a principal object of the present invention to provide a post cure inflator which will substantially eliminate "no PCI" defects.

Another important object is the provision of a post cure inflator which incorporates a loader automatically to center the tire on a prepositioning platform.

Still another important object is the provision of a post cure inflator which can accommodate different sizes and types of tires without any manual adjustment of centering devices or replacement of rings.

Yet another object is the provision of a post cure inflator which may optionally hold the tires for ambient cooling without inflation for all or part of the post cure cycle before discharge onto a take-away conveyor.

A further object is the provision of a post cure inflator which incorporates a loader operating at least partly in conjunction with the mechanism for opening and closing the post cure inflator.

It is also an important object of the present invention to provide a bead seating ring for a post cure inflator which can accommodate tires of different bead sizes, such ring having an essentially conical stepped outer edge, with the tread of each step being slightly more than the height, and the projecting corner of each step being chamfered to clear the sidewall of the tire when seated for sealing.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certail illustrative embodiments of the invention, these being indicative, however, of but a few of the various ways in which the principle of the invention may be employed.

In said annexed drawings:

FIG. 3 is an enlarged vertical section taken substantially on the line 3—3 of FIG. 2 illustrating the tire holding bars and their operation;

FIG. 4 is a fragmentary top plan view as seen from the line 4—4 of FIG. 3;

FIGS. 6–9 are each schematic illustrations illustrating exemplary steps in the centering, loading and unloading operations of the post cure inflator;

FIG. 10 is an enlarged axial section of the inner and outer rings employed with the post cure inflator for seating tires thereon of differing bead diameters; and FIG. 11 is a further enlarged detail of the steps of one of such rings.

GENERAL ARRANGEMENT

Figure 1:
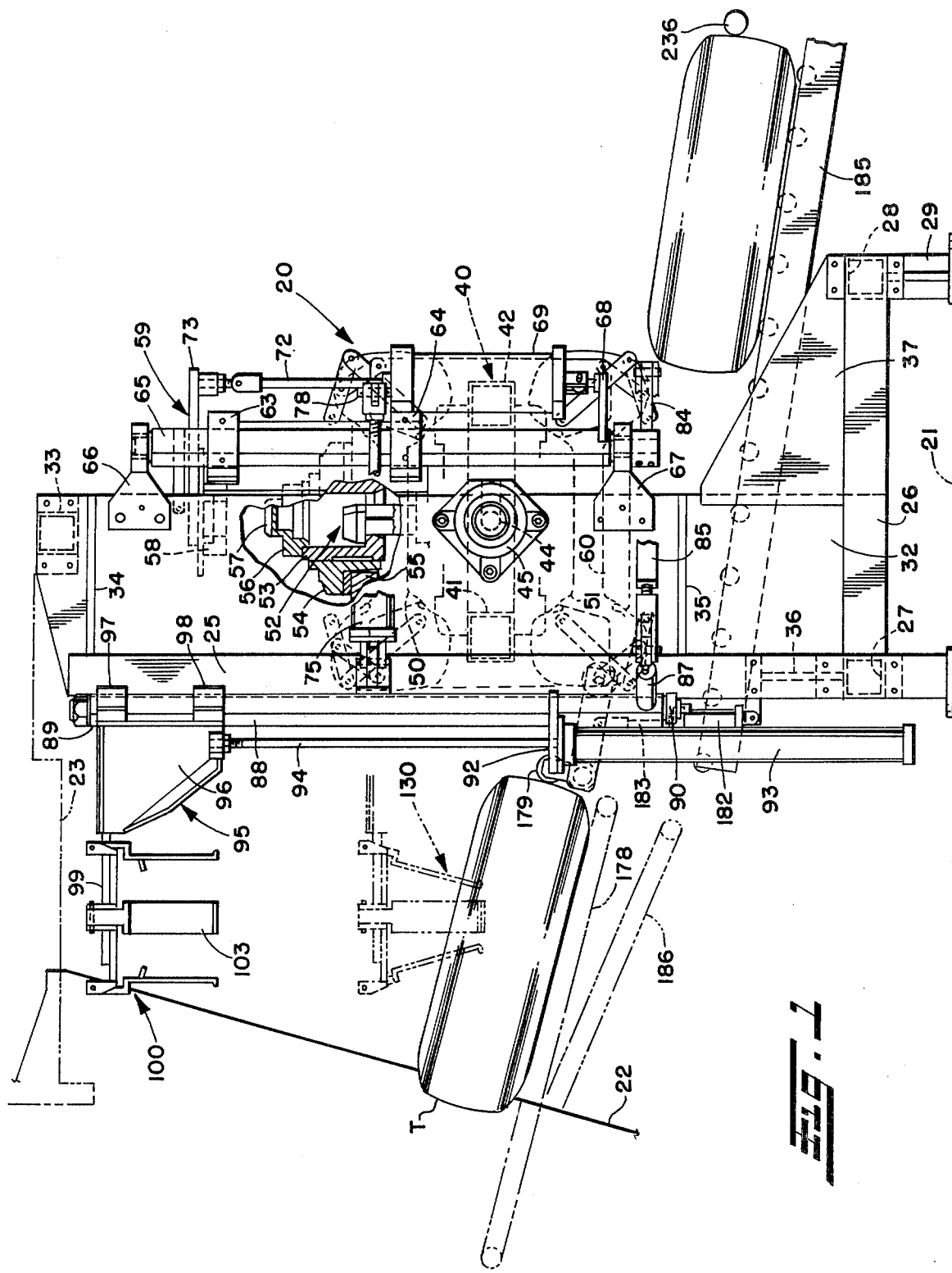
FIG. 1 is a side elevation of a post cure inflator in accordance with the present invention partially broken away and in section and also illustrating in outline the side plate and beam of the associated tire press, the latter shown in full open position.
Figure 2:
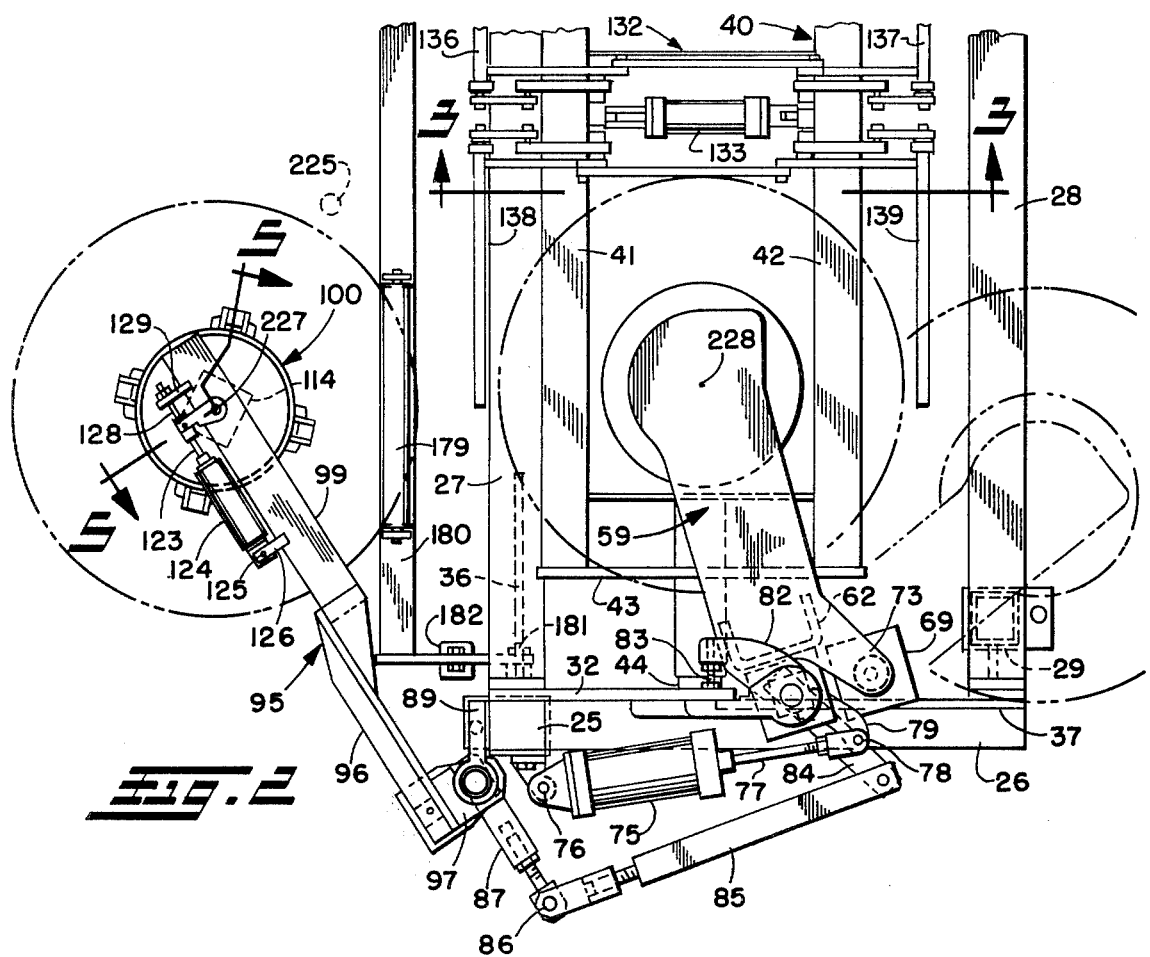
FIG. 2 is a top plan view of the post cure inflator with slightly less than half broken away as seen from the top of FIG. 1.

Referring now to FIGS. 1 and 2 it will be seen that the post cure inflator, shown generally at 20, is mounted on floor 21 to the rear of a tire press as depicted by the outline of the side plate 22 and the press beam 23, the latter being shown in the full open position. With the configuration of the side plate and the position of the beam as shown, the press is, of course, a tilt-back press. It will however be appreciated that the post cure inflator of the present invention may equally well be used with a slideback press wherein the top mold section remains parallel to the bottom mold section during vertical and horizontal movement. The invention may also be employed with other types of presses.

The frame of the post cure inflator includes two main vertical columns, one at each side of the post cure inflator as indicated at 25. Extending rearwardly from each column near the lower end thereof is a horizontal frame member 26, rearwardly being to the right as seen in FIGS. 1 and 2.

Interconnecting the columns 25 is a horizontal frame member 27 and a similar horizontal frame member 28 also connects the rear end of the horizontal frame members 26. Positioned beneath the horizontal frame member 28 are relatively short vertical feet 29, one foot being provided at each side of the post cure inflator.

Vertically extending side plates 32 are secured inside each of the columns 25 and the horizontal frame members 26. These side plates are interconnected at the top by horizontal frame member 33. Such horizontal frame member, for convenience only, is not shown in FIG. 2.

Horizontally disposed rigidifying gussets are provided at 34 and 35 between the side plate and the respective column. Vertically disposed gussets 36 are provided between the columns 25 and the horizontal frame member 27 while rearwardly extending gussets 37 extend between the side plates 32 and the horizontal frame members 26. The major columns and frame members may be fabricated of the square tubular members shown.

Journaled between the side plates is a trunnion frame 40 which comprises two elongated horizonal frame members 41 and 42 interconnected at each end by frames 43 from which project trunnion shafts 44 which are journaled at 45 to each side plate. The trunnion shaft opposite the viewer in FIG. 1 may be driven by a gear motor for rotation about a horizontal axis as seen more clearly, for example, in the aforementioned Yuhas et al U.S. Pat. No. 4,092,090.

The trunnion frame also supports laterally spaced pairs of inner oppositely directed tire supporting chuck rings 50 and 51 through which project axially rotatable lock shafts 52, which project into housings 53 in the manner seen in the copending application of Martin, Ser. No. 782,496, entitled "Post Cure Inflator", filed Mar. 29, 1977, now U.S. Pat. No. 4,124,337 dated Nov. 7, 1978 and assigned to the same assignee as the present application. The housing 53 is provided with an adjustable bolster 54 supporting outer post inflation ring 55. The details of the rings 55 and 50 are seen in greater detail in FIGS. 10 and 11. The housing 53 includes a cap 56 which has a projection 57 thereon fitting within ring 58 on the underside of vertically movable elevator arm 59. When the projection is within the ring it may be locked thereto in the same manner as shown in the aforementioned Yuhas et al U.S. Pat. No. 4,092,090. The ring paired with the ring 51 is seen in dotted lines at 60 in FIG. 1 and is locked thereto in the same manner.

It will be appreciated that there are four pairs of such rings on the post cure inflator, two for each cavity of the press. The lock shafts 52 projecting through inner rings 50 and 51 may be of the type shown in the aforementioned Martin U.S. Pat. No. 4,124,337 and incorporate a safety interference with the slot in the housing to preclude relative rotation of the shaft and housing unless the rings are as close to each other as possible.

The arm 59 includes a vertically extending U-shape structural element 62 which interconnects vertically spaced slide blocks 63 and 64 mounted for vertical sliding movement on square shaft 65 which is journaled top and bottom in brackets 66 and 67 secured to the side plate 32. Secured to the shaft 65 near the lower end thereof is a bracket 68 which supports the lower end of piston cylinder assembly 69. The rod 72 thereof is connected to the underside of offset 73 of the arm 59. The piston cylinder assembly 69 thus functions to raise and lower the arm 59 to pick up and replace the housing supporting the outer ring 55.

The shaft 65 is pivoted about its vertical axis by piston cylinder assembly 75, the blind end being pivoted at 76 to the column 25. The rod 77 is connected at 78 to the projecting end of crank arm 79 which is secured to the shaft 65.

The shaft 65 near its top is provided with a stop arm 82 which includes an adjustable abutment 83 adapted to bear against the inside of the side plate 32 as seen in FIG. 2.

Near the lower end of the shaft 65 there is provided an additional crank arm 84 to which is pivotally connected an adjustable link 85 which is pivoted at 86 to adjustable length arm 87. The arm 87 is secured to and projects horizontally from the lower end of square pivot shaft 88 which is journaled top and bottom in brackets 89 and 90 secured to the column 25.

Also secured to the shaft 88 is a bracket 92 supporting on the underside thereof piston cylinder assembly 93. The rod 94 of the piston cylinder assembly extends through the bracket and supports loader arm assembly 95 for vertical movement along the square shaft 88.

THE LOADER

The loader arm assembly 95 includes a vertically extending flanged, somewhat triangular, plate 96 which includes laterally offset slide blocks 97 and 98 guiding the arm for movement on the shaft. The loader arm 95 also includes offset arm extension 99 supporting loader chuck assembly 100 on the distal end thereof, the details of which are seen more clearly in FIG. 5.

Figure 5:
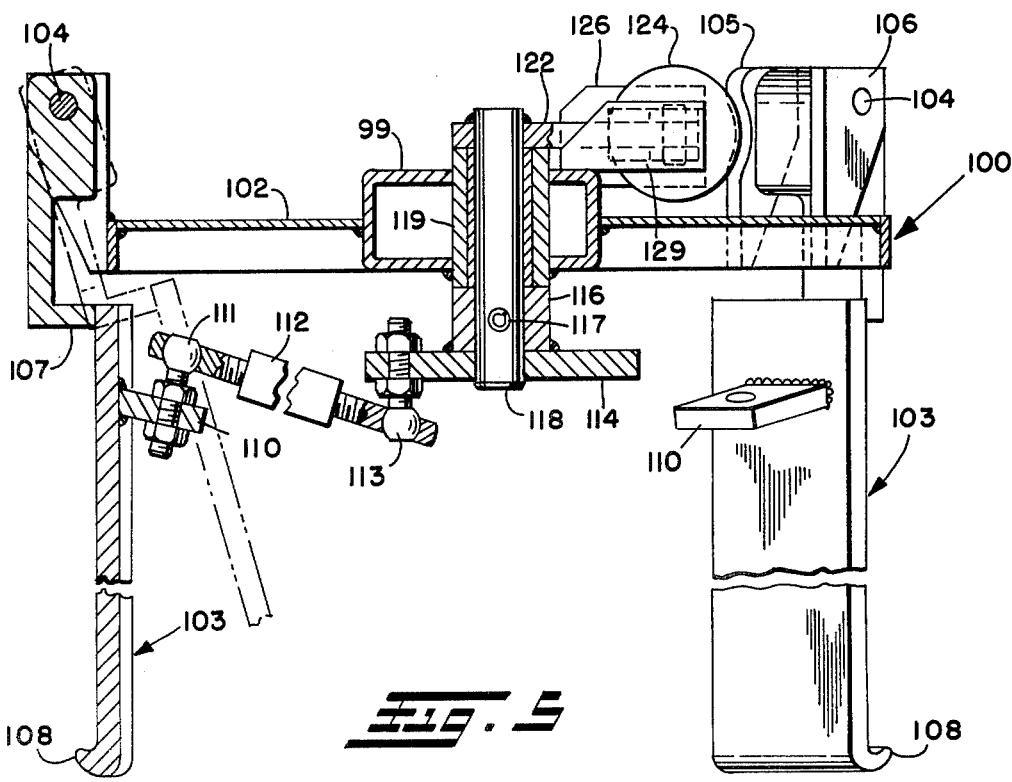
FIG. 5 is an enlarged vertical section of the loader as seen from the line 5—5 of FIG. 2.

Referring now to FIG. 5 it will be seen that the loader chuck comprises a circular flanged plate 102 from which are pendently pivotally supported four equally circumferentially spaced loader shoes 103, each of which is identical in form. Such loader shoes are pivoted at the top as indicated at 104 between a pair of ears seen at 105 and 106 which are secured to the flanged plate 102. Each shoe includes an offset seen at 107 to clear the flange of the plate in the fully retracted position thereof and the major extent of each shoe is a slightly arcuately shaped vertically elongated plate which terminates in an outturned lip 108 designed to fit beneath the upper bead of the tire.

Each shoe includes on its inner surface near the upper end thereof an inwardly extending slightly downwardly inclined ear 110 supporting upwardly extending ball pin 111 in the manner indicated. Such ball pin is connected by adjustable link 112 to downwardly extending ball pin 113 which is secured in like fashion to one of the corners of square actuator plate 114. The actuator plate is provided with four such ball pins, one on each corner, each connected by a similar adjustable link to the respective loader shoe.

The plate 114 includes a hub 116 connected by pin 117 to vertical shaft 118 journaled in hub 119 extending through the loader arm section 99. The top of the shaft 118 is secured to an arm 122, the outer end of which is pivotally connected to the clevis of rod 123 of piston cylinder assembly 124. The blind end of the piston cylinder assembly is connected at 125 to bracket 126 secured to the arm section 99. An adjustable stop 128 limiting extension of the rod 123 is mounted on bracket 129 in turn secured to the arm section 99. When the piston cylinder assembly extends it rotates the plate 114 in a clockwise direction as seen in FIG. 2 and the links 112 cause the shoes to pivot outwardly to the extent permitted by the stop 128. The links 112 are adjusted to assure that the links move at a uniform radius. The piston cylinder assembly is retracted to collapse the chuck as seen by the phantom line positions of the shoes at 130 in FIG. 1.

The vertical length of the shoes and the construction of the loader permit the chuck to be collapsed to fit within a 6½ inch (16.51 cm) diameter circle and to be expanded to fit within a 16 inch (40.64 cm) diameter circle.

TIRE RETAINERS

In order to secure the tire to the inner bead engaging ring even though the outer ring may be removed, there is provided a tire retaining or holding device indicated generally at 132 in FIGS. 2, 3 and 4. As indicated more clearly in FIG. 3, there are two identical holding devices on each side of the trunnion carriage 40 in the center thereof operated by respective cylinder assemblies 133 and 134. Accordingly, only the top unit will be described in detail.

Actual tire retention is accomplished by horizontally disposed holding bars 136, 137, 138 and 139. Such bars project in opposite directions as indicated in FIG. 4 and are designed to move from a retracted position opposite the tread of the tire to a position over and against the sidewall of the tire as indicated by the phantom line position 140, to clasp the tire to the interior ring of the post cure inflator. Referring first to the bars 138 and 139, it will be seen that each is mounted to extend horizontally from the distal ends of arms 142 and 143, respectively, the proximal ends of such arms being pivotally connected to bell cranks 144 and 145, respectively. The bell crank 144 is pivoted to stub shaft 146 projecting from frame plate 147 while the bell crank 145 is secured to the projecting end of pivot shaft 148 projecting from and journaled in frame plate 149. The shorter arms of the respective bell cranks are interconnected by a link 150.

The rod 152 of the piston cylinder assembly 133 is connected to crank arm 153 which is secured to the opposite or inner end of the pivot shaft 148.

The tire holding bars 136 and 137 project horizontally from the distal ends of arms 154 and 155, respectively, the proximal ends being supported by bell cranks 156 and 157, respectively, which are identical in form to the bell cranks 145 and 144, respectively. The shorter arms of such bell cranks 156 and 157 are interconnected by link 158 which is the same as link 150. The bell crank 156 is secured to for rotation with pivot shaft 160 projecting from frame plate 161. Bell crank 157 is idly pivoted on shaft 162 projecting from frame plate 163. The frame plates 161 and 163 are identical to the frame plates 147 and 149, respectively, and as indicated in FIG. 3 each is welded to one of the horizontal frame members 41 and 42 of the trunnion frame 40. The blind end of the piston cylinder assembly 133 is pivoted at 165 to crank arm 166 secured to shaft 160.

The arms 142 and 143 supporting the retaining bars 138 and 139 are also connected to the associated frame plates 147 and 149 by guide links 168 and 169. Similar guide links 170 and 171 support the arms 154 and 155 with respect to the associated frame plates 161 and 163, respectively.

The piston cylinder assembly 133 thus becomes an expansible and contractible link which when extended will move the holding bars 138 and 139 through the various phantom line positions seen in FIG. 3. Because of the inherent yet slight difference in the static friction of the two link systems operated by each end of the piston cylinder assembly, in operation it will function first to position one of the sets of bars in tire holding position and then when sufficient pressure is achieved against the tire sidewall, the other set of bars will then move to the desired tire retaining position as the piston cylinder assembly completes its stroke. In operation, rotation of the shaft 148 will move the bell crank 145 to swing the bar over the top of the tire and, because of the link connection 150, will also move the bell crank 144 pivoting the holding bar 138 as shown in FIG. 3. Retraction of the piston cylinder assembly 133 will return the tire holding bars to the full line retracted position shown. The links 168 and 169 guide the bars around the shoulder of the tire. Such holding bars may be provided with rollers or other suitable tire engaging surfaces to facilitate the precision dump discharge of the tire as hereinafter described. It is noted that the stroke of the linkage system is such that the retaining device will retain tires of different width or size, the bar in the phantom line position 174 showing the possible extent of movement as compared to the phantom line position 140 engaging the sidewall of a relatively large tire.

PRE-POSITIONING

Referring again to FIGS. 1 and 2, a tire T being discharged from the tire press moves down an inclined conveyor 178 and abuts against a stop roll 179 which is mounted on a frame 180 pivoted at 181 to the interior of the columns 25. A piston cylinder assembly indicated at 182 has its rod 183 connected to the frame to pivot the same to position the stop rolls 179 thereon in an operative or retracted position.

Situated beneath the trunnion frame 40 is a discharge conveyor 185 onto which the tires from the post cure inflator are discharged. As indicated in FIG. 1, the discharge conveyor 178 of the tire press may be pivoted to the position shown at 186 in substantial alignment with the discharge conveyor 185 so that the tire T, if desired, may bypass the post cure inflator.

SEALING RINGS

Because of the positive and precise centering obtained with the present invention, the bead engaging and sealing rings employed with the invention, seen in greater detail in FIGS. 10 and 11, need not include interfitting pilot or guide surfaces and can be constructed to seal and inflate tires of differing bead diameters. As seen in FIG. 10, the rings 50 and 55 can be brought adjacent each other with the ring 50 including an interior conical projection 200 fitting within a conical recess 201 of the ring 55. The recess 201 is provided with one or more slots 203 to permit inflation air to pass from the interior of the rings into the tire cavity. Otherwise the rings 50 and 55 are a mirror image of each other and accordingly only the ring 50 will be described in detail.

The outer edge of the ring is provided with an essentially stepped conical surface generally identified by reference numeral 240 providing three distinct bead seats or bead engaging steps for tires of differing bead diameters as indicated generally at 204, 205 and 206, respectively which may be referred to as an innermost, next adjacent and outermost step. As seen in FIG. 11, each step includes what may be termed a tread or horizontal or radial dimension and a height or axial dimension. Such dimensions intersect, for each step at the points seen at 241, 207 and 208, respectively. A line struck through such points is at an angle with respect to the axis of the ring of slightly more than 45°, or conversely forms an angle with respect to a line normal to the axis of the ring of slightly less than 45°. The tread of the two adjacent smaller diameter steps 204 and 205 is the same and may be approximately 0.5 inches as indicated by the dimensions 210 and 211. The tread of the outermost step 206 need not and preferably is not as large as the tread of the steps 204 and 205. Conversely, the height of the outer two steps 205 and 206 indicated by the dimensions 212 and 213, respectively, are the same while the dimension of the height of the iner step 204 is significantly less as indicated by the dimension 214. The dimensions 212 and 213 are important, particularly as related to the dimensions 210 and 211. For example, the dimensions 210 and 211 may be on the order of 0.5 inches while the dimensions 212 and 213 may be on the order of 0.437 inches. The dimension 214 may be on the order of 0.250 inches.

Another important feature of the configuration of the steps is the chamfer shown at 216 and 217 between the steps 206 and 205, and 205 and 204, respectively. The chamfer preferably is a straight chamfer and may be at an angle of about 45° as indicated by the angular dimensions 218 and 219, and removes almost the outer third of the tread of the innermost and next adjacent steps. The purpose of the chamfer is to avoid interference with the sidewall of the tire which may preclude proper seating for sealing. It has also been found that by providing the inner edge of each chamfer with a rounded corner with the tread as indicated at 220, which may be on the order of 0.062 inches, a mark or line on the sidewall of the tire is avoided. Also, the interior of each step may be rounded as indicated at 221 to conform to the bead.

With the rings of the present invention, the points 206, 207 and 208 on each ring may be brought within $\frac{1}{2}$ inch, $1\frac{3}{8}$ inches and $2\frac{1}{4}$ inches of each other to seal a 13, 14 and 15 inch bead tire, respectively. This has been found sufficient to seal the tires. Accordingly, one set of rings will accommodate tires of different standard bead diameters and need not be changed. The effectiveness of the rings of course is dependent upon the tire being precisely centered with respect thereto as the rings close toward each other.

OPERATION

Referring now to FIGS. 1 and 2 and additionally to schematic sequence illustrations FIGS. 6–9, it will be seen that the tire T is discharged from the tire press and moves down inclined conveyor 178 to abut against stop roll 179. Additional restraints for the tire may be provided as indicated at 225 in FIG. 2 on either or both sides of the tire. The stop roller 179 is positioned as close to the tire press as possible so that the tire does not have a chance to achieve significant momentum. When the tire is caught and restrained as indicated, it is not sufficiently centered for placement into the PCI but is simply brought to rest within a certain center or position or external stop tolerance of a first position at one side of the post cure inflator. Prior to the tire achieving the restrained position shown, the piston cylinder assembly 75 is extended to move the arms 59 and 95 to the position shown in FIG. 2. In FIG. 6, the vertical lines indicated at 88 and 65 represent the vertical axes of the repective pivot shafts for such arms. With control of the various adjustments shown in FIG. 2, the center of the loader indicated at 227 in FIG. 2 achieves a precise predetermined position or first position. Similarly, the center of the ring 58 on the underside of the arm 59 also achieves a precise predetermined position 228. The centers 227 and 228 are of the same radius from the center of the pivot shaft 88, even though the arm 59 is somewhat shorter than the loader arm 95. Although the arms 59 and 95 must swing in unison, they can and do move vertically independently.

In such restrained position as seen in FIG. 6, the tire T is ready to be loaded and the post inflator is ready to be unlocked and discharged. As indicated in FIG. 6, the post cure inflator has two tires therein indicated at 230 and 231. With the tire 230 deflated, the arm 59 now moves downwardly with the projection 57 on the housing 53 entering the ring 58. In the event there is any slight residual pressure in the tire, the arm forces the housing downwardly moving the rings 55 and 50 adjacent each other. In such position, the lock shaft 52 may now be rotated releasing the top ring. Also, the pin-latch mechanism as seen in the aforementioned Yuhas et al U.S. Pat. No. 4,092,090 is employed to secure the housing and top ring to the underside of the arm.

Simultaneously or independently, the loader 100 now moves downwardly with the loader chuck collapsed as indicated. With the loader chuck collapsed, it will readily fit within the upper bead of the tire even though the tire may not yet be precisely centered to such first position adjacent the post cure inflation. When the loader expands as indicated in FIG. 7, the tire will be brought to a position concentric with the loader center 227 and will achieve a horizontal position as the top bead of the tire slides down the shoes 103. In order to permit the tire to achieve the horizontal and centered position shown in FIG. 7, the stop roller 179 is retracted by retraction of the piston cylinder assembly 182 seen in FIG. 1. With the loader now having centered the tire, the loader is elevated to the position seen in FIG. 7 with the tire having been brought to its horizontal position. Also, the arm 59 is elevated lifting the top ring 55 clear of the tire 230.

In the position of FIG. 7, the tire 231 remains inflated while the tire 230 is now uninflated and is simply resting on the inner ring 50. The tire restraining bars are now actuated to move to the position shown in FIG. 7 adjacent and against the sidewalls of the tires. The restraining bars for both the top and the bottom may be actuated simultaneously or independently.

Referring now to FIG. 8, the trunnion 40 is now inverted so that the tire 230 is on the bottom and the inflated tire 231 is on the top. The restraining bars 139 and 138, in the position shown, keep the tire 230 from falling from the trunnion carriage prematurely. In such inverted position in FIG. 8, the restraining bars 139 and 138 are now retracted to the position opposite the tread and the tire 230 is free to fall a relatively short distance onto the discharge conveyor 185. In lieu of the inclined discharge conveyor 185, a flat conveyor belt may be provided indicated at 235 transferring the tires from the machine toward or away from the viewer.

With the tire 230 now discharged it may roll down the conveyor 185 as seen in FIG. 1 to engage retractable stop roller 236 and be held in such position until a further takeaway conveyor is clear.

As seen in FIG. 9, the trunnion is again reinverted and the now clear inner ring 50 is now facing upwardly ready to receive the tire T. In the meantime, the piston cylinder assembly 75 has been retracted swinging the arms 59 and 95 to the right as seen in FIG. 2 bringing the loader to a second position with the loader center 227 aligned with the center 228. The piston cylinder assembly 93 is now retracted moving the arm 95 downwardly to position the tire on the appropriate step of the ring 50. The loading chuck is now collapsed and the arm 95 elevated to its maximum position. The piston cylinder assembly 75 is now extended swinging both arms to the position seen in FIG. 2. Piston cylinder assembly 69 now retracts bringing the arm 59 down to seat the ring 55 on the top bead of the tire and moves the rings 50 and 55 fully adjacent each other to clear the interference with the lock shaft 52 whereupon the rings may be locked together. When locking is achieved, the ring 58 is unlocked from the projection 57 and the arm 59 is elevated. The arms remain elevated and in the position seen in FIG. 2 until the next loading and unloading cycle commences.

The post cure inflator of the present invention provides at least three options. The tire may pass completely through the post cure inflator avoiding the post cure inflation operation if desired. Also, it may be desired to retain the tire for ambient cooling before discharge onto a conveyor for further operation or inspection. In such event, the outer rings 55 need not be employed. The tire is simply then placed on the inner rings and retained in such position by the retaining bars engaging the sidewalls. In this manner the tire is open interiorly and may be simply retained for ambient cooling for any desired fraction of twice the cure cycle of the press.

It can now be seen that there is provided a post cure inflator which will minimize the troublesome "no PCI" defect. The post cure inflator catches and restrains the tire before momentum builds up prepositioning it within certain rather wide tolerances. The loader then brings the tire to a precise center so that it can be placed on such center in the PCI. With such precision centering, the PCI may utilize simplified sealing rings which need not be changed to accommodate tires of different bead diameters. This is an important feature, since PCI's are normally behind the press and are not readily accessible for change of parts of adjustments. Moreover, with the tire restraining device of the present invention, unloading is simplified, being accomplished simply by inversion of the trunnion.

Other modes of applying the principle of the invention may be employed, change being made as regards the details described, provided the features stated in any of the following claims or the equivalent of such be employed.

We therefore particularly point out and distinctly claim as our invention:

1. A post-inflation ring for inflating tires of different bead sizes comprising an essentially conical outer edge having a plurality of bead engaging steps including at least an innermost and next adjacent step, each step having a radially extending tread and an axially extending height, the tread of each step being at least slightly more than the respective height of each step whereby the angle of said conical outer edge with respect to a line normal to the axis of said ring is slightly less than 45°, and straight chamfers relieving the radially outer third of the treads of said innermost step and at least said next adjacent step, each straight chamfer having an angle with respect to a line normal to the axis of said ring of about 45° to avoid interference with the side wall of a tire thus to preclude improper seating of the tire for sealing, and each straight chamfer having a radially inner edge forming a corner with the tread of each respective step and said corner being rounded.

2. A ring as set forth in claim 1, wherein said ring has an outermost step and the tread of said innermost and next adjacent steps is related to the height of said next adjacent and outermost steps in an approximate ratio of 0.50/0.437.

3. A post cure inflator for use with a tire press comprising a pair of vertically separable tire inflating chuck rings, means to position a tire adjacent said post cure inflator within an external stop tolerance to a first position at one side of said post cure inflator after it is released from the tire press, loader means including expansible chuck means having a chuck center operative then to pick up the tire and position the same concentric with said chuck center, and means to shift horizontally said chuck means and the tire from such first position to a second position with said chuck center in alignment with the center of one of said chuck rings, said chuck means being operative in such second position to place the tire properly centered on said one of said chuck rings in said post cure inflator.

4. An inflator as set forth in claim 3, including second loader means operative to remove the other of said separable tire inflating chuck rings and move the same horizontally to clear said one of said chuck rings for loading of the tire.

5. An inflator as set forth in claim 4, including means interconnecting said first mentioned and second loader means to require they move horizontally in unison.

6. An inflator as set forth in claim 5, including means operative to move each loader means vertically independently of the other.

7. An inflator as set forth in claim 6, wherein each loader means is mounted on a vertically extending axially rotatable shaft, and adjustable link means interconnecting said shafts for concurrent axial rotation.

8. An inflator as set forth in claim 7, wherein each shaft is non-circular in section, each loader means including a jib arm mounted on its respective shaft for axial sliding movement therealong and swinging movement with said shafts as the latter rotate.

9. An inflator as set forth in claim 8, wherein said jib arms are of unequal length so that said first mentioned loader means travels farther than said second loader means when said shafts are rotated.

10. An inflator as set forth in claim 3, wherein said expansible chuck means when collapsed has a diameter approximately one-half the diameter of the bead of the smallest tire accommodated thereby.

11. An inflator as set forth in claim 10, wherein said expansible chuck means comprises vertically elongated pivotally mounted shoes holding the tire in a horizontal position.

12. An inflator as set forth in claim 11, wherein said means to position a tire adjacent said post cure inflator comprises an inclined conveyor, a stop roll, and means to retract said stop roll as said first mentioned loader means picks up the tire to clear the tire to swing to such horizontal position.

13. An inflator as set forth in claim 3, wherein each chuck ring has multiple annular concentric bead engaging steps for inflating tires of different bead sizes.

14. An inflator as set forth in claim 13, wherein each said chuck ring includes at least an innermost, next adjacent and outermost step and each step has a tread, and the tread of said innermost and next adjacent steps of each chuck ring is related to the height of said next adjacent and outermost steps in the approximate ratio of 0.50/0.437.

15. An inflator as set forth in claim 13, wherein each said chuck ring includes at least an innermost and next adjacent step, and including straight chamfers on said innermost step and at least said next adjacent step.

16. An inflator as set forth in claim 15, wherein each chamfer relieves approximately the outer third of the tread of the respective step.

17. An inflator as set forth in claim 16, wherein each chamfer is at 45°.

18. An inflator as set forth in claim 17, wherein the corner of said chamfer and the respective step is rounded.

19. A post cure cooler for a just cured tire including a movable frame, a tire support secured to said frame including means for receiving a tire thereon, and retractable tire holding means operative to hold a tire to said support and thus said frame without closing the interior of the tire for movement of the tire with said support and movable frame, said tire holding means including a holding bar movable from a position outside the tread of the tire to a position in engagement with the side wall of the tire, and vice versa.

20. A cooler as set forth in claim 19, wherein said frame is a rotatable trunnion frame which includes oppositely extending tire supports thereon rotatable to an upwardly extending position, and comprising means to load a tire on said tire supports when said tire supports are in said upwardly extending position, said tire holding means being operative to hold the tire after loading thereof to said tire supports as said trunnion frame rotates.

21. A cooler as set forth in claim 20, including means to remove the tire holding means when said frame is inverted to permit such the tire to drop from said tire support.

22. A post cure inflator of the flip-over type which includes a rotatable frame, a first tire inflating rim secured to said frame, a second tire inflating rim, means for locking said second rim to and for removing said second rim from said first rim, and tire holding means operative to hold a tire to said first rim and thus said frame for rotation therewith when said second rim is removed and to release the tire therefrom upon rotation of said frame.

23. A post cure inflator as set forth in claim 22, wherein said tire holding means includes a holding bar movable from a position outside the tread to a position in engagement with the sidewall, and vice versa.

24. A post cure inflator for use with a tire press including vertically separable chucks, means to restrain a tire rolling free from the tire press before entering said post cure inflator to hold the tire within a location tolerance outside of said post cure inflator, loader means having a loader center operative to pick up the tire from its restrained position and bring the tire into alignment with said loader center, and means then to shift said loader means and the tire thus centered to alignment with one of said chucks of said post cure inflator and place the same in contact with said one of said chucks prior to release of the tire by said loader means to ensure that the tire is properly positioned in said post cure inflator before it closes.

* * * * *